United States Patent
Kato et al.

(10) Patent No.: US 10,146,207 B2
(45) Date of Patent: Dec. 4, 2018

(54) NUMERICAL CONTROL APPARATUS

(71) Applicant: FANUC CORPORATION, Minamitsuru-gun, Yamanashi (JP)

(72) Inventors: Tomokazu Kato, Yamanashi (JP); Kazuo Sato, Yamanashi (JP); Hideaki Maeda, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 231 days.

(21) Appl. No.: 15/210,139

(22) Filed: Jul. 14, 2016

(65) Prior Publication Data

US 2017/0017228 A1 Jan. 19, 2017

(30) Foreign Application Priority Data

Jul. 17, 2015 (JP) .................. 2015-142613

(51) Int. Cl.
G05B 19/00 (2006.01)
G05B 19/408 (2006.01)

(52) U.S. Cl.
CPC .. *G05B 19/408* (2013.01); *G05B 2219/32128* (2013.01); *G05B 2219/34291* (2013.01)

(58) Field of Classification Search
None
See application file for complete search history.

(56) References Cited

U.S. PATENT DOCUMENTS

| | | | | |
|---|---|---|---|---|
| 4,907,190 A | * | 3/1990 | Sasaki | G05B 19/4147 710/5 |
| 5,564,049 A | * | 10/1996 | Schmidt | G05B 19/0426 |
| 6,272,388 B1 | * | 8/2001 | Buvel | G05B 19/0426 700/108 |
| 6,411,857 B1 | * | 6/2002 | Flood | G05B 19/0428 700/4 |
| 6,535,782 B1 | * | 3/2003 | Tignor | H05K 3/043 700/105 |
| 8,948,902 B2 | * | 2/2015 | Hacklander | G05B 19/414 700/159 |

(Continued)

FOREIGN PATENT DOCUMENTS

| | | |
|---|---|---|
| CN | 102500800 A | 6/2012 |
| CN | 102830654 A | 12/2012 |

(Continued)

OTHER PUBLICATIONS

Decision to Grant a Patent for Japanese Application No. 2015-142613, dated Jul. 25, 2017, including English translation, 6 pages.

(Continued)

*Primary Examiner* — Jason Lin
(74) *Attorney, Agent, or Firm* — RatnerPrestia

(57) ABSTRACT

A numerical control apparatus includes an API interface section that accepts invocation of an API function, an API control section that executes the process of the API function based on the invocation of the API function, and processing period estimation means for estimating if the execution of the API function is completed in a predetermined period, and the API control section does not execute but terminates the process of the API function when the processing period estimation means estimates that the execution of the API function will not be completed in the predetermined period.

3 Claims, 4 Drawing Sheets

(56) References Cited

U.S. PATENT DOCUMENTS

2013/0310950 A1   11/2013   Chiang et al.

FOREIGN PATENT DOCUMENTS

| CN | 103530436 A | 1/2014 |
|---|---|---|
| JP | H07191718 A | 7/1995 |
| JP | 2001014013 A | 1/2001 |
| JP | 2006024185 A | 1/2006 |
| JP | 2009-204477 A | 9/2009 |
| JP | 2009-217713 A | 9/2009 |

OTHER PUBLICATIONS

Chinese Office Action for Chinese Application No. 2016105614032, dated Mar. 28, 2018, including English translation, 12 pages.

* cited by examiner

FIG. 2

| DATA TYPE (API FUNCTION) | UPPER-LIMIT CPU LOAD |
|---|---|
| ACQUISITION OF TOOL COORDINATE DATA | 70% |
| ACQUISITION OF MACHINE SIGNAL DATA | 80% |
| ACQUISITION OF SIMULATION DATA | 30% |
| ...... | ...... |

NUMERICAL CONTROL APPARATUS

BACKGROUND OF THE INVENTION

Field of the Invention

The present invention relates to a numerical control apparatus, and particularly to a numerical control apparatus capable of screen update even at the time of a heavy load.

Description of the Related Art

A numerical control apparatus is intended to control the motion of a motor for high-precision, high-speed processing in which a desired shape is obtained. The motion control includes a task of analyzing a machining program and a task of creating interpolation data for driving the motor on the basis of a result of the analysis, and high priority is given to these tasks among a plurality of tasks. For example, in five-axis machining of a shape of three-dimensional sculptured surface that is formed of continuous minute blocks and requires heavy-CPU-load operation, the CPU is very busy with the task of analyzing the program and the task of creating interpolation data, and a large amount of time is allocated for the tasks. As a result, the amounts of time allocated for other tasks to which low priorities are given decrease.

In some numerical control apparatus, a control apparatus main body that performs the motion control and an HMI (human machine interface) that is means for information communication between an operator and the numerical control apparatus are run by different CPUs. In this case, the HMI usually operates as an application on a general-purpose OS. The control apparatus main body has an application interface apparatus for data communication with an external apparatus, and the application interface apparatus is typically called an API. The HMI performs data communication with the control apparatus main body via the API. Since the specification of an API is open to the public, a machine tool builder can create, as an application on a general-purpose OS, a proprietary HMI according to a machine manufactured by the machine tool builder.

Since the HMI is run by a CPU different from a CPU that runs the control apparatus main body, time allocated for an HMI-related task does not decrease even in heavy-CPU-load operation. On the basis of a request from an API invoked by the HMI, the control apparatus main body executes a process of preparing data to be displayed on the screen of the HMI or any other process. Priority given to the task of preparing the data is lower than priority given to the motion control task. When heavy-CPU-load operation is performed, it affects and shortens time allocated for the task of preparing the data. As a result, it takes a longer time for the API to return a response.

In addition to a numerical control apparatus, when the load on a CPU increases in a PC and a variety of control apparatus, it takes a long time to update the screen and respond to manual operation in some cases. Such a state is stressful to the operator. The operator then feels uneasy because the operator is not sure whether the PC or the apparatus is operating normally or is hung up or whether, in the case of a numerical control apparatus, machining is being normally performed.

To avoid such a situation, in heavy-CPU-load operation, a technology for reducing the amount of data displayed on the screen so that the frequency of screen update does not lower has been proposed.

For example, Japanese Patent Laid-open No. 2009-204477 proposes a technology for simplifying information displayed on the screen in heavy-CPU-load operation to lower the frequency of screen update for a decrease in processing period in a car navigation device. Japanese Patent Laid-open No. 2009-217713, which relates to a robot control system formed of a control apparatus main body and a portable manual operation section that is an HMI, proposes a technology for handling a situation in which the CPU in the portable manual operation section is operating under a heavy load by reducing the amount of image data transferred from the control apparatus main body to reduce the burden on the portable manual operation section for prevention of degradation in screen update and operability. In both the technologies of related art, the amount of data to be processed is reduced to reduce the burden on the HMI for prevention of deterioration of screen display and operability.

In a numerical control apparatus in which the control apparatus main body and the HMI are run by different CPUs, an operation-related CPU load influences the processing time of the API. The degree of the influence of the CPU load on the API varies API to API. That is, an API is greatly influenced, whereas another API is hardly influenced. In a case where an API greatly influenced by heavy-CPU-load operation is invoked by the HMI, it takes a long time to complete the process. Since an API typically returns no response until a required process is completed, the HMI cannot execute the following process during the invocation. Further, when the process cannot be completed in a predetermined period, the API returns a timeout error and the process is aborted. Also in this case, the following process cannot be executed until the API returns the timeout error. Since the following process cannot be executed, the screen update is delayed during the invocation, and the operator cannot therefore manually operate the HMI in the meantime but is forced to wait. Further, since even when the API returns a timeout error and the process is aborted, no cause of the timeout error is notified, and the HMI cannot therefore evaluate whether the timeout error occurred due to heavy-load operation.

FIG. 4 shows an example of the flowchart of screen display. The screen display process has a loop structure, and monitoring of an event (step SA01) and acquisition of data to be displayed on the screen/update of the displayed data (steps SA05 to SA07) are sequentially performed. When a screen update event (step SA04) is received, the screen is updated, and when a screen switching event (step SA02) is received, the control leaves the loop of the currently displayed screen, and a screen switching process (step SA03) is executed.

In the display process illustrated in the flowchart shown in FIG. 4, data 1 to data N are displayed on the screen. In a case where at least one of APIs for acquiring the data 1 to data N is influenced by an operation-related load and it therefore takes time to invoke the API, the screen is not updated during the invocation irrespective of successful invocation or a timeout error. Further, since no event can be monitored during the invocation, the screen cannot be switched even when a screen switching request is received.

In contrast, each of Japanese Patent Laid-open No. 2009-204477 and Japanese Patent Laid-open No. 2009-217713 is a technology for reducing the amount of data to be handled to lower the load on the CPU in the HMI for continuous screen update and therefore considers no CPU load on the data preparation side, which means that each of them does not solve the problem described above.

SUMMARY OF THE INVENTION

An object of the present invention is to provide a numerical control apparatus that considers the load on a CPU in the control apparatus main body, which is the data preparation side, and is therefore capable of screen update in the HMI even in heavy-CPU-load operation.

In the present invention, an API (application programming interface) capable of estimating if a process is completed in a predetermined period on the basis of the CPU load is provided. The present invention provides a numerical control apparatus capable of acquiring data via the API to perform screen update even in heavy-CPU-load operation.

A numerical control apparatus according to the present invention includes an API for acquiring data used in a process relating to an HMI, a load definition table in which an upper-limit CPU load of the numerical control apparatus is defined for each API function provided by the API, the upper-limit CPU load ensuring that a process of the API function is completed in a predetermined period set in advance, an API interface section that accepts invocation of an API function provided by the API, an API control section that executes a process of the API function based on the invocation of the API function, load monitoring means for monitoring a load on a CPU in the numerical control apparatus, and processing period estimation means for estimating if the execution of the API function is completed in the predetermined period by referring to the load definition table based on information on the invocation of the API function and a current CPU load value monitored by the load monitoring means, and the API control section does not execute but terminates the process of the API function when the processing period estimation means estimates that the execution of the API function will not be completed in the predetermined period.

The numerical control apparatus may further include an HMI control section that controls display of a screen based on data acquired via the API, and when the processing period estimation means estimates that the execution of the API function will not be completed in the predetermined period, the API control section may return an error code representing a heavy load via the API interface section to a source that has made the invocation, and when an API function provided by the API is invoked to acquire data on a display item displayed on the screen, but the error code representing a heavy load is returned, the HMI control section may not update the data on the display item on the display screen but change a display attribute of the data.

When the API function provided by the API is invoked to acquire data on a display item displayed on the screen but the error code representing a heavy load is returned, the HMI control section may output an alarm representing that the display cannot be updated because the CPU in the numerical control apparatus is operating under a heavy load.

According to the present invention, the HMI performs screen display in such a way that an operator can grasp an item that cannot be updated because it takes time to acquire data via an API. It is therefore expected that the operator is notified that no problem with the numerical control apparatus has occurred, and that the operator's uneasiness about occurrence of problems with the machining and the machine is eliminated.

BRIEF DESCRIPTION OF THE DRAWINGS

The object and features of the present invention described above and other objects and features thereof will be apparent from the description of the following embodiment with reference to the accompanying drawings:

FIG. 2 shows an example of a load definition table in the embodiment of the present invention;

DETAILED DESCRIPTION OF THE PREFERRED EMBODIMENTS

The present application is an application that claims priority of Japanese Patent Application No. 2015-142613 filed on Jul. 17, 2015 in Japan. The contents of the Japanese application are incorporated by reference in the contents of the present application.

An embodiment of the present invention will be described below with reference to the drawings.

In the present embodiment, in a numerical control apparatus formed of a control apparatus main body and an HMI that are run by different CPUs, a process can be aborted in a predetermined period even in heavy-CPU-load operation in the control apparatus main body irrespective of normal completion or error termination of the process. Further, in the HMI that provides an API capable of notifying a heavy load and communicates with the control apparatus main body via the API, a screen is updated and switched even when the CPU in the control apparatus main body is operating under a heavy load.

More specifically, the load on the CPU in the control apparatus main body is monitored, and when an API that serves as an interface for data communication with the HMI or an external application is invoked, it is estimated whether data required by the invocation of the API is allowed to respond in a predetermined period under the current CPU load. When it is estimated that the data will not be allowed to respond, the API does not execute the process but immediately returns an error representing the heavy load and the process is aborted. The configuration described above allows a heavy-load error response to be immediately returned in response to the API invocation when the control apparatus main body is operating under a heavy load, whereby the HMI or the external application can execute a display screen update process in accordance with the content of the response.

Figure 1:
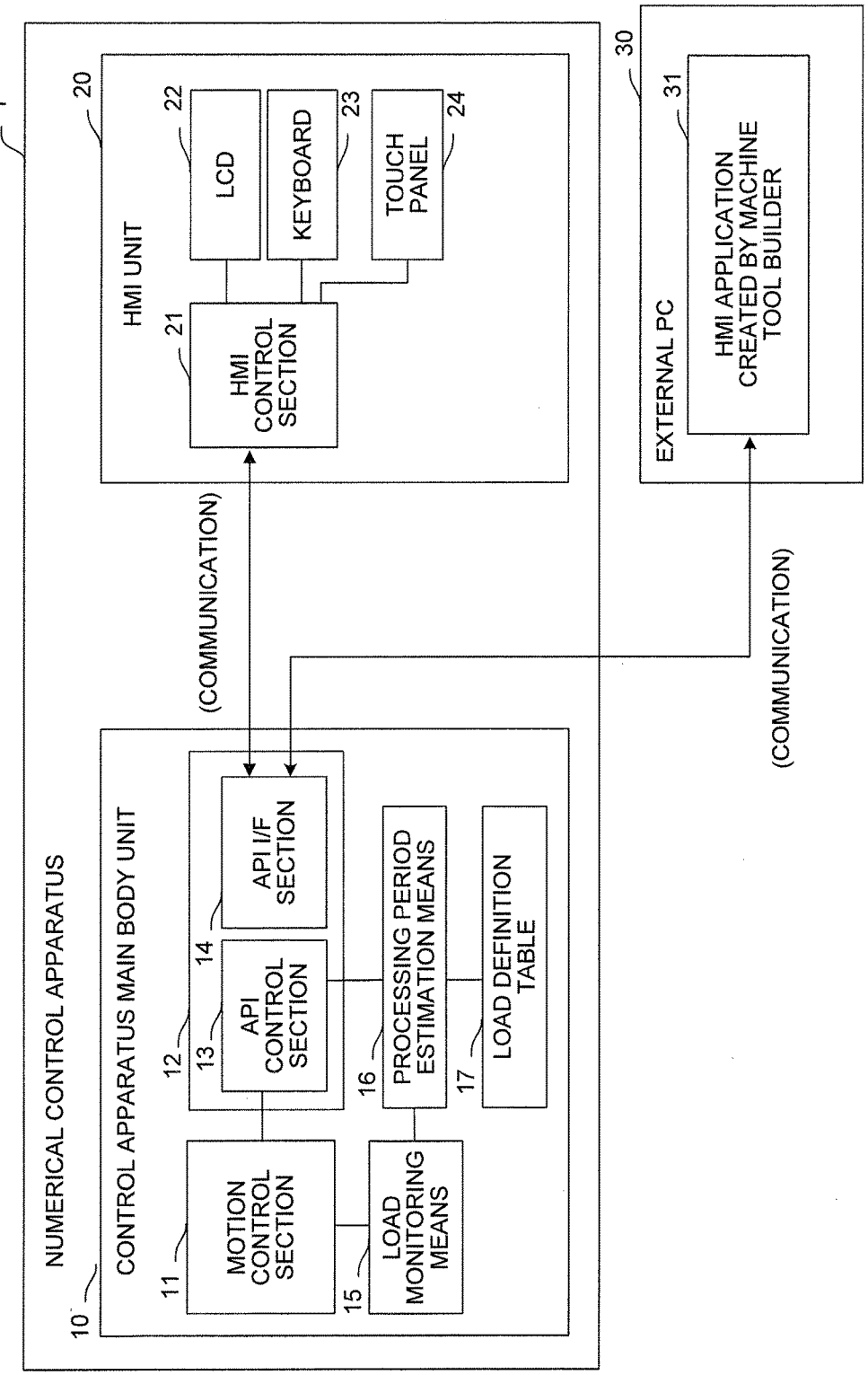
FIG. 1 is a schematic configuration diagram of a numerical control apparatus in an embodiment of the present invention.

FIG. 1 shows a schematic configuration of the numerical control apparatus in the present embodiment. A numerical control apparatus 1 includes a control apparatus main body unit 10, which is responsible for motion control, and an HMI unit 20, which is means for information communication with an operator.

The control apparatus main body unit 10 includes a motion control section 11, which controls the motion of a motor, an API 12, which serves as an interface for data communication with the HMI unit 20 and an application 31 running on an external PC 30, load monitoring means 15 for acquiring the current CPU load from the motion control section, processing period estimation means 16 for estimating a processing period, and a load definition table 17 provided in a memory that is not shown.

The motion control section 11 is a section that performs machine control that is a primary function of the numerical control apparatus 1. The motion control section 11 analyzes a machining program that is inputted or read from a memory that is not shown, creates interpolation data for driving the motor or any other component on the basis of a result of the analysis, and uses the interpolation data to control a machine to be controlled. The motion control section 11 has a function of returning a variety of data associated with the control of the machine in response to invocation from an external apparatus.

The API 12 is an interface for data communication with the HMI unit 20 and the application 31 running on the external PC and includes an API control section 13, which controls the situation of the API invocation process, and an API interface section 14, which is an interface with an external apparatus.

The API control section 13, when it receives API function invocation from an external apparatus via the API interface section 14, instructs the processing period estimation means 16, which will be described later, to estimate whether the process of the API function will be completed in a predetermined period. When the processing period estimation means 16 has estimated that the process of the API function will be completed in the predetermined period, the API control section 13 instructs each section of the control apparatus main body 10, such as the motion control section 11, to execute the process of the invoked API function. The API control section 13 then returns a result of the execution and a code representing normal completion via the API interface section 14 to the side where the invocation has been made. On the other hand, when the processing period estimation means 16 has estimated that the process of the API function will not be completed in the predetermined period, the API control section 13 does not execute the API function but returns an error code representing a heavy load via the API interface section 14 to the side where the invocation has been made.

The load monitoring means 15 monitors the current CPU load of the CPU that executes the process of the motion control section 11 and outputs the current CPU load in response to an instruction from the processing period estimation means 16.

The processing period estimation means 16, when it receives information on the API function invocation from the API control section 13 and an instruction to estimate the processing period of the API function, receives the current CPU load from the load monitoring means 15. The processing period estimation means 16 then estimates whether or not the process of the API function will be completed in the predetermined period on the basis of the information on the API function invocation, the current CPU load, and the load definition table 17.

FIG. 2 shows an example of the load definition table 17 in the present embodiment. In the load definition table 17, an upper-limit CPU load that allows unit data to be processed in a predetermined period is defined on an API function basis, as shown in FIG. 2. The example shown in FIG. 2 indicates that in a case of execution of an API function process of acquiring tool coordinate data, when the CPU load is 70% or lower, the tool coordinate data can be returned in the predetermined period (500 ms, for example). The predetermined period may be so set as to be shorter than the timeout period of the API function invocation and further appropriately so set that the display update in the HMI unit 20 is not delayed. Further, the upper-limit CPU load that allows unit data to be processed in a predetermined period on an API function basis is, for example, experimentally calculated in advance and registered in the load definition table 17.

The processing period estimation means 16 compares the current CPU load with the upper-limit CPU load associated with the API function process and defined in the load definition table 17. When the current CPU load is greater than the upper-limit CPU load associated with the API function process, the processing period estimation means 16 estimates that data processing in the API function cannot be completed in a predetermined period, whereas when the current CPU load is not greater than the upper-limit CPU load associated with the API function process, the processing period estimation means 16 estimates that the processing will be completed in the predetermined period. The processing period estimation means 16 notifies the API control section 13 of a result of the estimation.

When acquisition of a plurality of data sets is required in the API function invocation, appropriate correction may be made on the upper-limit CPU load defined in the load definition table 17, for example, the upper-limit CPU load may be multiplied by $1.1^{\wedge}$ (the number of acquired data sets $-1$), and then the corrected upper-limit CPU load may be compared with the current CPU load.

The HMI unit 20 is means for information communication with the operator and includes an HMI control section 21, a display section 22, such as an LCD, and an input section 23, such as a keyboard or a touch panel.

The HMI control section 21 generates a display screen showing the running status of the numerical control apparatus 1, machine control information, and other pieces of information and performs control that displays the display screen in the display section 22. The HMI unit 20 acquires data on each item necessary for the generation of the display screen from the control apparatus main body unit 10 via the API 12.

When the HMI control section 21 acquires data on an item to be displayed on the screen via the API 12, and the API 12 returns an error code representing a heavy load, the HMI control section 21 does not update the display of the item on the display screen but changes the display color of the item that could not be updated. Further, when the API 12 returns an error code representing a heavy load, the HMI control section 21 displays a message on the display screen stating that screen update is temporarily inhibited due to a heavy load.

Figure 3:
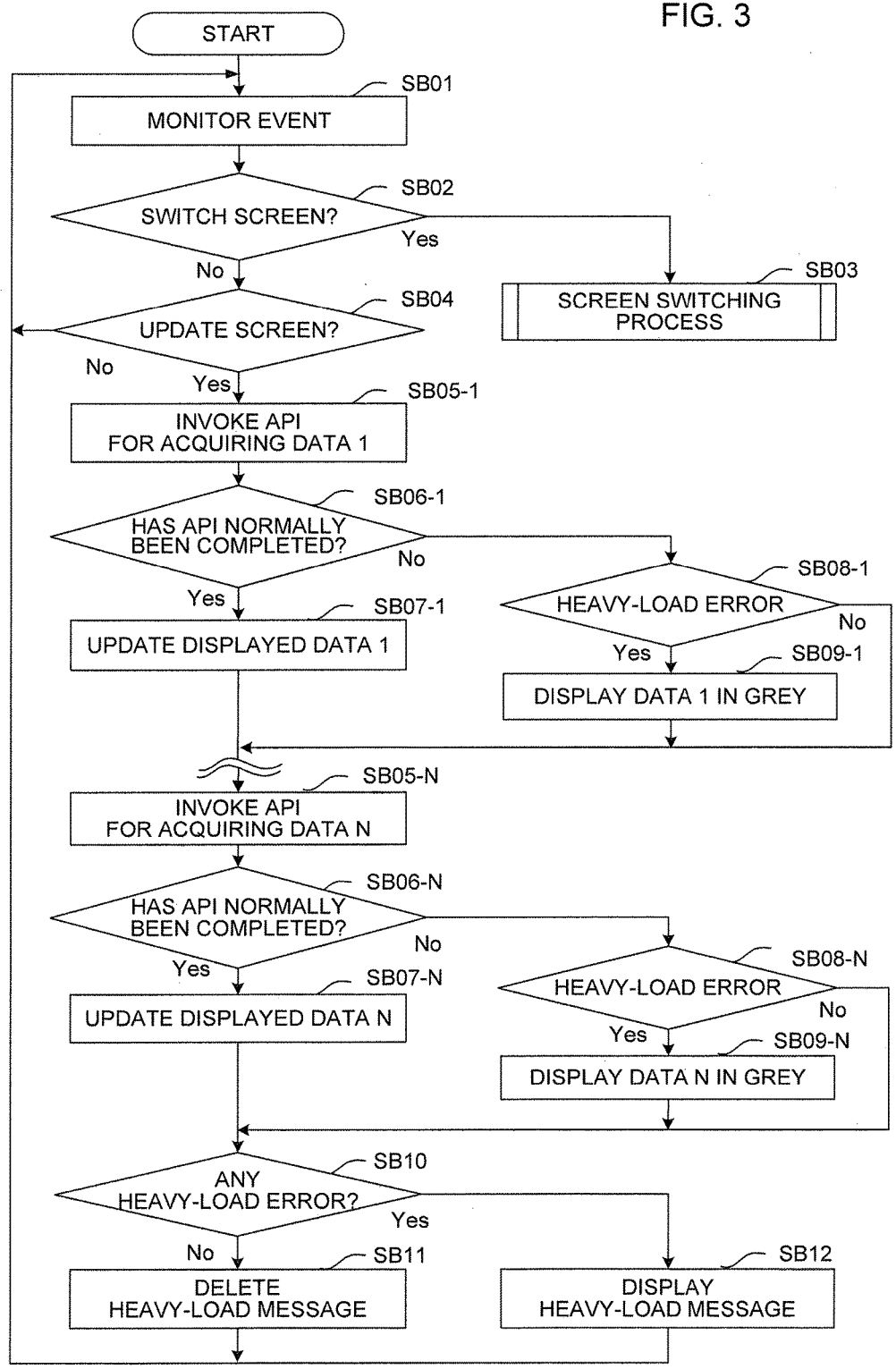
FIG. 3 is a flowchart of a process executed by an HMI unit in the embodiment of the present invention.
Figure 4:
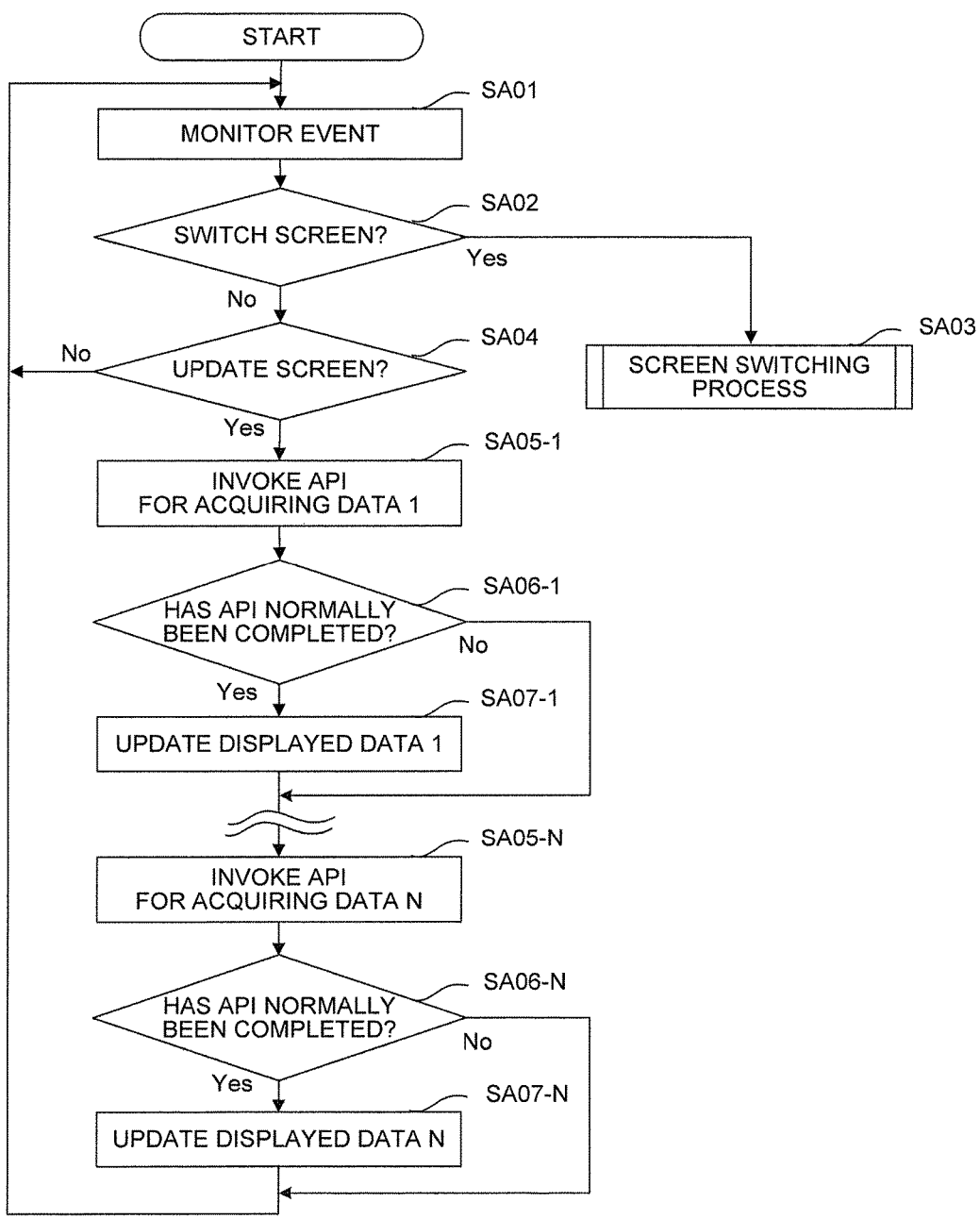
FIG. 4 is a flowchart of a process executed by an HMI unit in related art.

FIG. 3 is a flowchart of a screen display process executed by the HMI control section 21.

[Step SB01] The HMI control section 21 monitors an event produced, for example, by an external signal and an event inputted via the input section 23.

[Step SB02] It is evaluated whether or not a screen switching event has occurred in step SB01. When a screen switching event has occurred (YES), the control proceeds to step SB03, whereas when no screen switching event has occurred (NO), the control proceeds to step SB04.

[Step SB03] The current screen display is terminated and switched to screen display specified by the screen switching event.

[Step SB04] It is evaluated whether or not a screen update event has occurred in step SB01. When a screen update event has occurred (YES), the control proceeds to step SB05-1, whereas when no screen update event has occurred (NO), the control returns to step SB01.

[Step SB05-1] The HMI control section 21 invokes an API function provided by the API 12 and functioning to acquire data 1 among item data displayed on the screen.

[Step SB06-1] It is evaluated whether or not the API function that had been invoked in step SB05-1 has been normally completed. When the API function has been normally completed (YES), the control proceeds to step SB07-

1, whereas when the API function has not been normally completed (NO), the control proceeds to step SB08-1.

[Step SB07-1] The data 1 acquired by the API function invocation in step SB05-1 is updated on the display screen.

[Step SB08-1] It is evaluated whether or not an error code returned in the API function invocation in step SB05-1 is an error code representing a heavy-load error. When the returned error code is an error code representing a heavy-load error (YES), the control proceeds to step SB09-1, whereas when the returned error code is not an error code representing a heavy-load error (NO), the control proceeds to step SB05-2 (not shown).

[Step SB09-1] The HMI control section 21 switches the display of the data 1 on the display screen to display showing that the data 1 could not be updated due to a heavy CPU load, for example, by displaying the data 1 on the display screen in grey.

Processes in steps SB05-2 to SB09-N are then executed on data 2 to data N.

[Step SB10] It is evaluated whether or not the heavy-load error has been returned in the API function invocation in any of the execution of steps SB05-1 to SB09-N. When the heavy-load error has been returned in any of the steps (YES), the control proceeds to step SB12, whereas when the heavy-load error has not been returned in any of the steps (NO), the control proceeds to step SB11.

[Step SB11] The HMI control section 21 deletes the message on the display screen stating that the screen update is temporarily inhibited due to a heavy load and returns to step SB01.

[Step SB12] The HMI control section 21 displays the message on the display screen stating that the screen update is temporarily inhibited due to a heavy load and returns to step SB01.

The external PC 30 is a general-purpose or dedicated computer connected to the numerical control apparatus 1 via a communication interface provided in the numerical control apparatus 1. The HMI application 31 created by a machine tool builder can be run on the external PC 30, and executing the application 31 allows a display section that is not shown to display, for example, the state of the numerical control apparatus 1. The action of the HMI application 31 is substantially the same as that of the HMI unit 20 and will therefore not be described.

The numerical control apparatus 1 according to the present embodiment, which includes the configuration described above, reliably completes a process in the API 12 in a predetermined period even in heavy-CPU-load operation. Therefore, in the HMI unit 20 or the external PC 30, items other than those that require a long period to acquire data via the API 12 are updated. Further, each item that cannot be updated can be displayed in a different color, and a message stating that screen update is inhibited can be displayed on the screen. It is therefore expected that the operator is notified that the numerical control apparatus 1 intentionally inhibits screen update and no problem with the numerical control apparatus 1 has occurred, and that the operator's uneasiness about occurrence of problems with the machining and the machine is eliminated.

The embodiment of the present invention has been described above, but the present invention is not limited to the embodiment described above and can be implemented in a variety of other aspects with appropriate changes.

For example, the example in which an item that cannot be updated due to a heavy load is displayed in grey is presented above, and the item may instead be displayed in another color or reversed, blinked, or in a different display attribute. Further, the message displayed on the display screen and stating that screen update is temporarily inhibited due to a heavy load is not necessarily provided in the form of a message and may be notified, for example, in the form of alarm sound or an alert lamp.

The invention claimed is:
1. A numerical control apparatus comprising:
an application programing interface (API) for acquiring data used in a process relating to a human machine interface (HMI);
a load definition table in which an upper-limit central processing unit (CPU) load of the numerical control apparatus is defined for each API function provided by the API, the upper-limit CPU load ensuring that a process of the API function is completed in a predetermined period set in advance;
a CPU configured as:
an API interface section that accepts invocation of an API function provided by the API;
an API control section that executes a process of the API function based on the invocation of the API function;
load monitoring means for monitoring a load on the CPU in the numerical control apparatus; and
processing period estimation means for estimating if the execution of the API function is completed in the predetermined period by referring to the load definition table based on information on the invocation of the API function and a current CPU load value monitored by the load monitoring means,
wherein the API control section does not execute but terminates the process of the API function when the processing period estimation means estimates that the execution of the API function will not be completed in the predetermined period.
2. The numerical control apparatus according to claim 1, further comprising
another CPU configured as an HMI control section that controls display of a screen based on data acquired via the API,
wherein when the processing period estimation means estimates that the execution of the API function will not be completed in the predetermined period, the API control section returns an error code representing a heavy load via the API interface section to a source that has made the invocation, and
when an API function provided by the API is invoked to acquire data on a display item displayed on the screen, but the error code representing a heavy load is returned, the HMI control section does not update the data on the display item on the display screen but changes a display attribute of the data.
3. The numerical control apparatus according to claim 2, wherein when the API function provided by the API is invoked to acquire data on a display item displayed on the screen but the error code representing a heavy load is returned, the HMI control section outputs an alarm representing that the display cannot be updated because the CPU in the numerical control apparatus is operating under a heavy load.

* * * * *